DIFFERENTIAL SEALING OF GLASS COMPONENTS

Filed Aug. 7, 1959 3 Sheets-Sheet 1

INVENTORS
Norman D. Korbitz
Ernest L. Staples, Jr.
BY Stevens, Davis, Miller & Mosher
ATTORNEYS

DIFFERENTIAL SEALING OF GLASS COMPONENTS

Filed Aug. 7, 1959 3 Sheets-Sheet 2

INVENTORS
Norman D. Korbitz
Ernest L. Staples, Jr.
BY
Stevens, Davis, Miller & Mosher
ATTORNEYS

DIFFERENTIAL SEALING OF GLASS COMPONENTS

Filed Aug. 7, 1959 3 Sheets-Sheet 3

INVENTORS
Norman D. Korbitz
Ernest L. Staples, Jr
BY
Stevens, Davis, Miller & Mosher
ATTORNEYS United States Patent Office
3,032,941
Patented May 8, 1962

3,032,941

DIFFERENTIAL SEALING OF GLASS COMPONENTS

Norman D. Korbitz, Richardson, and Ernest L. Staples, Jr., Dallas, Tex., assignors to Texas Instruments Incorporated, Dallas, Tex., a corporation of Delaware
Filed Aug. 7, 1959, Ser. No. 832,387
9 Claims. (Cl. 53—22)

This invention relates generally to electrical circuit devices and more particularly to those devices of this class which include elements that are encapsulated and hermetically sealed in glass.

A principal object of this invention is to provide a process for encapsulating elements in a hermetically sealed capsule by the use of a differential pressure between the interior of the package and the surrounding atmosphere at the time the sealing actually takes place to form the sealed end of the capsule.

Another object is to provide a process in which the advantages of differential sealing may be realized when making a capsule having either a pressurized or an evacuated interior.

An additional object is to provide a method employing a single apparatus by which an electrical element may be encapsulated in either a vacuum or an inert gas atmosphere.

A still further object is to provide a process for encapsulating electrical elements in a pressurized inert atmosphere which includes a plurality of operational steps, including at least one pressure change, which are automatically controlled from the step of insertion of an unsealed unit into a pressure chamber to its removal therefrom as a completed pressurized component.

And another object is to provide a process for encapsulating electrical elements in a vacuum atmosphere which includes a plurality of operational steps which are automatically controlled from the step of insertion of an unsealed unit into a vacuum chamber to its removal therefrom as a completed evacuated component.

And still another object of this invention is to provide a novel apparatus for carrying out the process described herein.

These and other objects and advantages will become apparent from an examination of the following specification and drawings, in which.

Figures 1, 4, 5, 6:
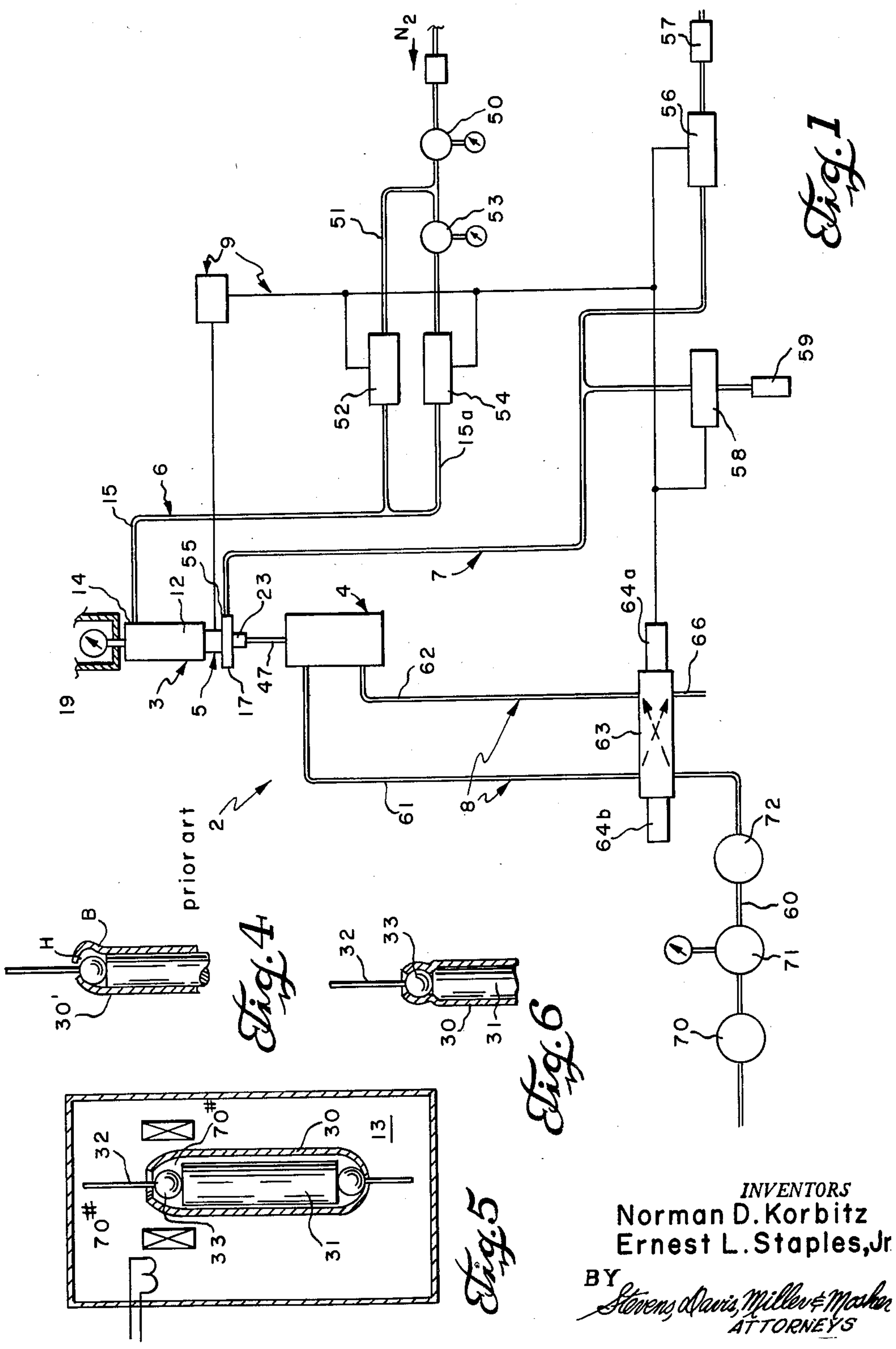
FIGURE 1 is a schematic view showing the over-all system and fluid cycle arrangement employed in carrying out the process of this invention.
FIGURE 4 shows one of the difficulties encountered in prior art sealing processes which is overcome by this invention.
FIGURE 5 is a cross-sectional view of an element being sealed in a glass tube by the differential process of this invention.
FIGURE 6 is a cross-sectional view of the completed device of FIGURE 5.

Referring now more particularly to the characters of reference in the drawing, it will be observed in FIGURE 1 that the system, indicated generally at 2, employed in carrying out the process of this invention, comprises basically the following equipment: a capsule sealing unit 3; an air cylinder 4 for loading and unloading electrical elements to be encapsulated in glass into the sealing unit 3; a R.F. induction heating unit indicated at 5; a pressure plumbing system 6; a vacuum or exhaust plumbing system 7; an air control cycle 8; and an electrical control circuit 9.

Figure 2:
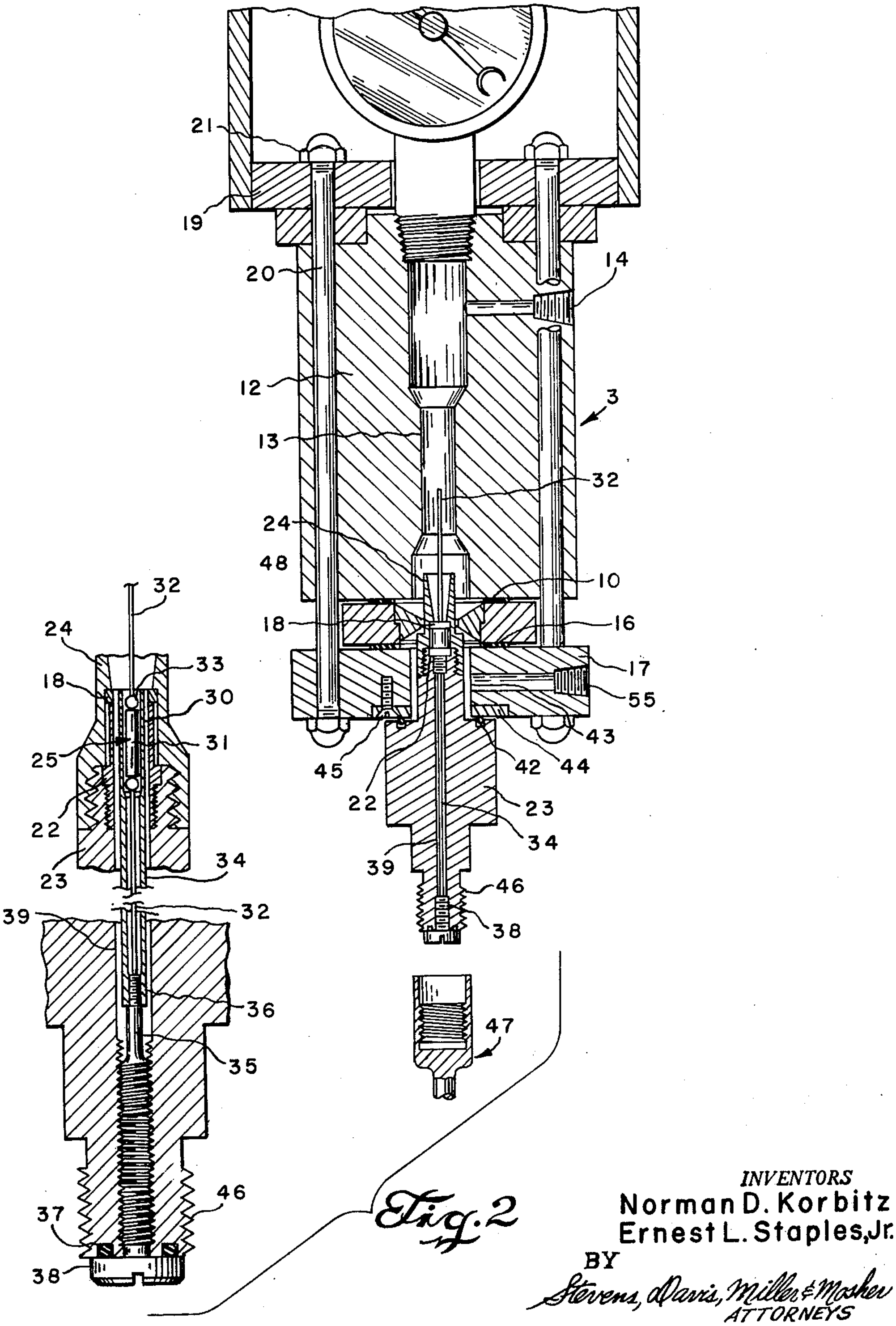
FIGURE 2 is a cross-sectional elevational view of a cylindrical capsule sealing unit which may be used in carrying out the process of this invention.

The capsule sealing unit 3 may be examined in more detail by reference to FIGURE 2 wherein it is seen to include a main body or chamber housing 12 including an axially extending stepped bore which forms the combination pressure and vacuum chamber 13 used in the process of this invention. Near the upper end of the chamber 13, a pressure inlet 14 connects the interior of the chamber with the pressure line 15 of pressure system 6. The primary element 16 of induction heating unit 5 is sandwiched between the lower end of housing 12 and the upper end of vacuum ring 17 with heat resistant sealing gaskets 10 on each side of element 16. The primary element 16 is a conventional water cooled copper work coil and the secondary element 18 is a small carbon ring which closely surrounds the work piece to be heated. The housing 12, heater element 16, and vacuum ring 17 are all held together and supported from a mounting plate 19 by means of long bolts 20 and caps 21 to form the total sealing unit 3. The carbon ring 18 is supported on the top ledge of a boron nitride plug 22 which threadedly engages the air cylinder adapter 23 near the top end thereof and the ring 18 is held in place by means of a boron nitride sleeve cap 24 which is threaded to adapter 23 in surrounding relation to the ring 18 and the plug 22.

The work piece 25 to be hermetically sealed by the method of this invention may be any element which is suited for insertion into a glass housing or tube 30 and by way of example and not of limitation the element chosen for this disclosure is a carbon coated ceramic body resistor 31. Lead wires 32 extend axially from the body of the resistor 31, and a glass bead 33 is sealed to each lead wire 32 before the resistor 31 is inserted in the glass tube 30. The complete work piece 25 is then held in place within the plug 22 by a combination of means including a long sleeve 34 which extends axially through the plug 22 and adapter 23 and an axially adjustable plug 35. The upper end of the sleeve 34 and, consequently, the glass tube 30 resting thereon is adjusted to the proper height by means of plug 35 which engages the lower end of sleeve 34. At this height, the glass tube 30 will extend at its upper end to the vicinity of the carbon heating ring 18. The small set screw 36 threads into the bottom threaded end of sleeve 34 and the upper end of the set screw 36 engages the lower end of lead wire 32 and, thus, acts as a positioner for the resistor 31 within the tube 30 so that the proper end sealing may be accomplished.

An O ring 37 and cap 38 close the bottom open end of the axial channel 39 into which the sleeve 34 and plug 35 extend and prevent leaks through this channel to or from chamber 13. Another O ring 42 seals the normally open cavity 43 of the vacuum ring 17 when the adapter 23 is in its upper stroke or "load" position. The area adjacent the point of contact of the O ring 42 and the vacuum ring 17 is reinforced by a copper plate insert 44 held to the ring 17 by screws 45.

The lower end of adapter 23 includes threads 46 which are adapted for connection with the upper end of piston rod 47. When the piston rod 47 retracts, the adapter 23 and its attached cap 24 and included work piece 25 are all withdrawn from the chamber 13 and cavities 43 and 48 so that the now completed work piece 25 may be removed and another tube 30 and resistor 31 may be inserted. The usual procedure in sealing the ends of the glass tubes 30 is to form one end first on a plurality of resistors 31 and then invert the units so that the sealed end is facing downward and then seal the remaining open end by the unique differential pressure technique to be hereinafter described.

Referring now to FIGURE 1, the previously-described schematic layout was shown to include a pressure plumbing system 6, an exhaust plumbing system 7, and an air control system 8, as well as an electrical circuit 9. The system 6 includes a pipe 15 which directs pressurized nitrogen from a supply source (not shown) at a relatively high pressure (above 85 p.s.i.) through a high pressure regulator 50 and then branching to let one path be through a bypass line 51 with an electrically controlled solenoid valve 52 therein and back to pipe 15. The other path 15*a* being through low pressure regulator 53 (70 p.s.i.) and through its solenoid 54 and on through pipe 15 to the inlet fitting 14 and into chamber 13 of the housing 12. The vacuum exhaust system 7 draws air or nitrogen out of the chamber 13 through fitting 55, and through vacuum pump 57 when solenoid 56 is open. When it is desired merely to exhaust or equalize the pressurized nitrogen, the solenoid 56 may remain closed and the solenoid 58 opened to permit the pressure to equalize through the open exhaust muffler 59.

The air control system 8 includes an air supply line 60, a pair of air control lines 61 and 62, both of which pass through a valve block 63 operated by an integral solenoid 64 to control which line 61 or 62 will receive the air pressure and which line will connect to the exhaust 66. One particular solenoid valve 63 which may be used is that known as Beckett Hi-Cycle AB2A–2. The air supply line 60 includes an air filter 70, a pressure regulator 71, and an oil mist lubricator 72.

Figure 3:
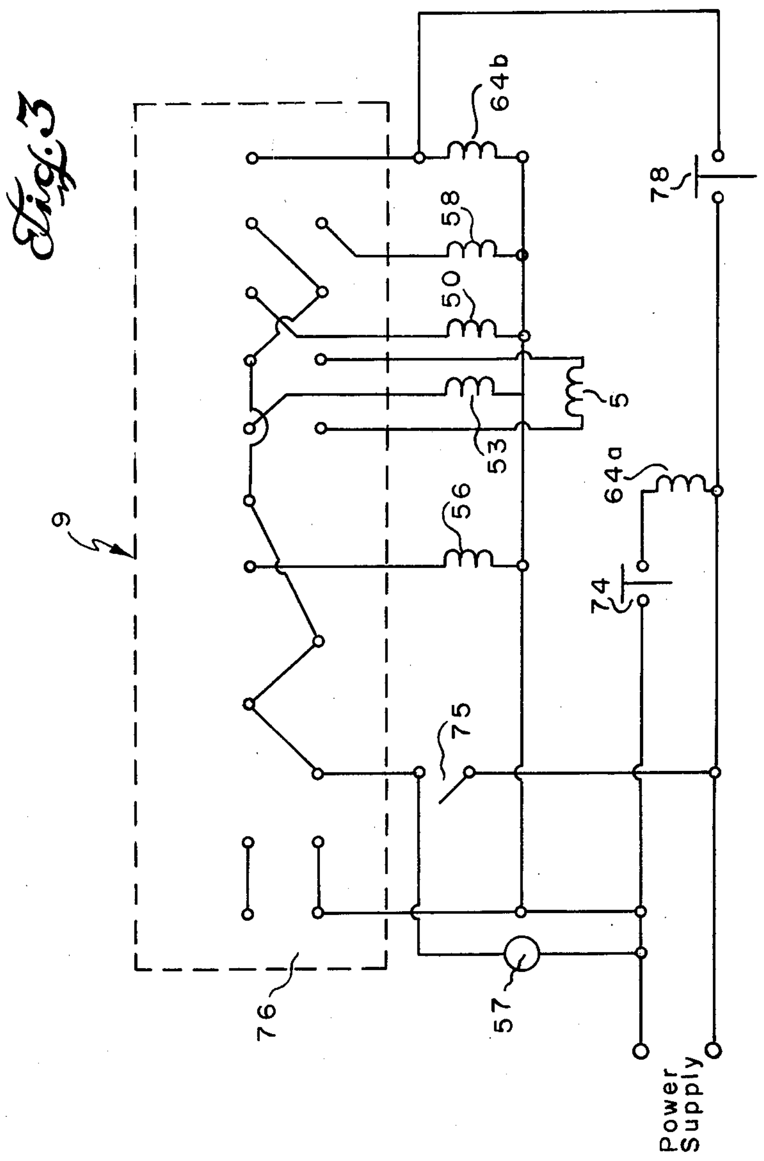
FIGURE 3 is an electrical schematic diagram of the control circuit of this invention.

The electric circuit 9 (FIGURE 3) is so arranged that, once the starter button 74 is engaged, the "up" solenoid valve 64*a* directs air to the cylinder 4, and this moves adapter 23 up to a position to close the chamber 13. At this point, switch 75 closes, and the operation of the cycle becomes automatic through the use of a timer 76 to control all of the operating cycles of this process. An emergency down switch 78 is provided to open chamber 13 in case of malfunction. It will be clearly apparent that this operation could be controlled as well by separate manual controls. The timer 76 is a commercial unit manufactured by the Eagle Signal Corporation and sold under the identity of Eagle Multiflex Timer Programmer. By the proper setting of this unit in the hook-up shown, the following sequence found effective for one particular operation may be established for manufacturing pressurized resistors.

*Table I*

| Step Involved (For Pressurized Units) | Time in Seconds | |
|---|---|---|
| | On (Start) | Off (Stop) |
| | (Progressive from Zero Sec.) | |
| 1. Draw vacuum (27″ Hg) on Chamber 13 | 0 | 2 |
| 2. Introduce $N_2$ at low pressure (70 p.s.i.) | 2 | 8 |
| 3. Heat by RF Induction | 2 | 8 |
| 4. Introduce $N_2$ at high pressure (85 p.s.i.) | 8 | 16 |
| 5. Exhaust nitrogen | 16 | 17 |

A similar presentation may be made for the vacuum cycle:

| Step Involved (For Vacuum Units) | Time in Seconds | |
|---|---|---|
| | On (Start) | Off (Stop) |
| | (Progressive from Zero Sec.) | |
| 1. Apply $N_2$ pressure to Chamber 13 (20 p.s.i.) | 0 | 1 |
| 2. Draw vacuum on chamber (27″ Hg) | 1 | 6 |
| 3. Heat by RF induction | 2 | 6 |
| 4. Apply $N_2$ at low pressure (1 p.s.i.) | 6 | 16 |
| 5. Exhaust nitrogen | 16 | 17 |

FIGURE 4 shows a typical side wall bulge B which has been encountered in prior art sealing methods. This bulge may contain either a gas bubble or a small air hole H which is made by escaping gases which have obtained a higher pressure inside the glass tube 30′ during the heat forming operation than the surrounding or ambient pressure. This condition may occur either in a vacuum chamber sealing operation or in an atmospheric or pressurized chamber, since the excess heat causes the internal gas or air to expand and attempt to escape from inside the tube 30′; even in a "vacuum" there remains some air which will be expanded by heat. The process of this invention will overcome this difficulty by the introduction of additional ambient pressure at the precise moment of sealing so that the internal pressure is at least balanced and thereby eliminates the tendency of internal entrapped gases to escape due to their greater pressure than the external surrounding pressure. In FIGURE 5, the method depicted uses an initial ambient pressure of 70 p.s.i. which, of course, immediately equalizes both inside and outside the tube 30. Then when heat is applied to close the upper end of tube 30, the opening becomes more restricted and this heat pressurizes the entrapped gases and they attempt to escape out the now restricted opening. But at this particular moment, an instantaneously applied greater pressure (85 p.s.i.) is introduced to the ambient area, and this establishes a differential pressure between the internal pressure and the external pressure. This action not only prevents the escape of any internal gases, but actually bows in the tube 30 in the vicinity of the glass bead 33 to place a greater area of the inside of the glass tube 30 in direct contact with the periphery of the glass bead to effect a greater sealing area as seen in FIGURE 6.

Similar results may be obtained by using the vacuum process in which the pressure differential is obtained by simply admitting one p.s.i. of nitrogen to the evacuated chamber 13. However, for practical reasons, this vacuum sealing process involves a first step of admitting 20 p.s.i. of nitrogen to the chamber 13 to mix with any atmospheric air which may be there and may contain moisture or impurities. This is done through the setting of the high pressure regulator 50. The next step would be to draw a vacuum on the chamber 13 of about 27″ of mercury. At the precise moment the differential pressure is needed, the low pressure regulator then admits one p.s.i. of nitrogen and the sealing operation is completed. Time-controlled switches (not shown) within the multiflex timer 76 direct current to the proper solenoids in sequence to provide the vacuum sealing process steps in a similar manner as the pressurized process is obtained.

In carrying out either the pressurized or the vacuum differential process of this invention, the timing cycle will lower the adapter 23 to permit inserting or removing a resistor assembly into the plug 22, and thus exposing the chamber 13 to atmospheric air. Upon starting the next sealing process cycle by manually depressing the starting switch 74, the air cylinder 4 will close the chamber 13 by moving the adapter 23 into the position shown in FIGURE 2. The next procedure in one embodiment of the invention is to flush the chamber 13 with $N_2$ while evacuating the chamber 13 through the vacuum pump 57 so that all the potentially moist atmosphere has been removed, and then to apply either of the processes shown in Table I.

Although certain specific embodiments of the invention have been shown and described, it is obvious that many modifications thereof are possible. The invention, therefore, is not to be restricted except by the scope of the appended claims.

What is claimed is:

1. A method of sealing elements within a glass housing having at least one open end comprising the steps of: placing the element within the housing in such a manner that the main portion of the element is completely within the outline of the housing, applying heat to the open end of said housing until the glass adjacent the open end is molten and the atmosphere within the housing has increased in pressure to a higher pressure than the atmosphere outside of the housing, and increasing the pressure of the outside atmosphere until it exceeds the inside pressure by a sufficient amount to prevent the escape of the inside pressure during the sealing operation.

2. A method of sealing elements within a glass housing having at least one open end, comprising the steps of: placing the element within the housing, placing both the element and the housing within an enclosure, introducing an inert atmosphere into the enclosure and inside the housing, heating the open end of said housing until the glass thereadjacent becomes molten and the atmosphere inside the housing has increased to a higher pressure than the atmosphere surrounding the housing, and increasing the pressure of the surrounding atmosphere until it exceeds the inside pressure and maintaining this excess pressure until the molten end has sealed.

3. A method as in claim 2 wherein said first named inert atmosphere is at a vacuum pressure.

4. A method as in claim 2 wherein said inert atmosphere is nitrogen.

5. A method as in claim 1 wherein said increase in pressure of the outside pressure over the inside pressure is of the order of one atmosphere.

6. A method of sealing electrical elements within a glass housing having an open end, comprising the steps of: placing an element within the housing, placing the element and housing in an enclosure, drawing a vacuum on the enclosure, heating the open end of the housing until it starts to collapse about said element, rapidly introducing a pressurized atmosphere into the enclosure to further collapse and seal the open end and thereby encapsulate the element in a substantially vacuum atmosphere.

7. A method of sealing electrical elements having axial leads within a glass tube, comprising the steps of:

forming a generally round surface glass bead on said leads, sealing one end of the tube about one of said beads, placing the element and partially sealed tube in an enclosure, filling the enclosure with an inert atmosphere, drawing a vacuum on the enclosure, refilling the enclosure with an inert atmosphere, heating the remaining open end until it starts to collapse about said element, rapidly introducing a pressurized inert atmosphere into that portion only of the enclosure external to the tube to further collapse and seal the interior surface of the tube near its remaining open end about the surface of the round glass bead and thereby encapsulate an inert atmosphere within the tube.

8. An apparatus for encapsulating electrical elements in glass housings having selectively a pressurized inert or an evacuated atmosphere within the housing comprising: a chamber, means to simultaneously insert an element to be encapsulated in a glass housing and seal the chamber, means to introduce an inert atmosphere into said chamber, means to heat seal the glass housing about the element, and means to rapidly substantially increase the pressure in said chamber surrounding said glass housing just prior to the completion of the sealing operation until the molten end has sealed.

9. An apparatus as in claim 8 wherein said last-named means comprises a parallel supply line, a pair of pressure regulators installed for operation in said line, means including said regulators to rapidly introduce the inert atmosphere at the increased pressure into the chamber.

References Cited in the file of this patent

UNITED STATES PATENTS

| | | |
|---|---|---|
| 2,262,685 | Kronquest | Nov. 11, 1941 |
| 2,361,413 | Pujol Y. Fort | Oct. 31, 1944 |
| 2,622,779 | Smith et al. | Dec. 23, 1952 |
| 2,837,880 | Rosenblatt et al. | June 10, 1958 |
| 2,893,182 | Pies | July 7, 1959 |
| 2,918,763 | Doran | Dec. 29, 1959 |